United States Patent Office 2,722,141
Patented Nov. 1, 1955

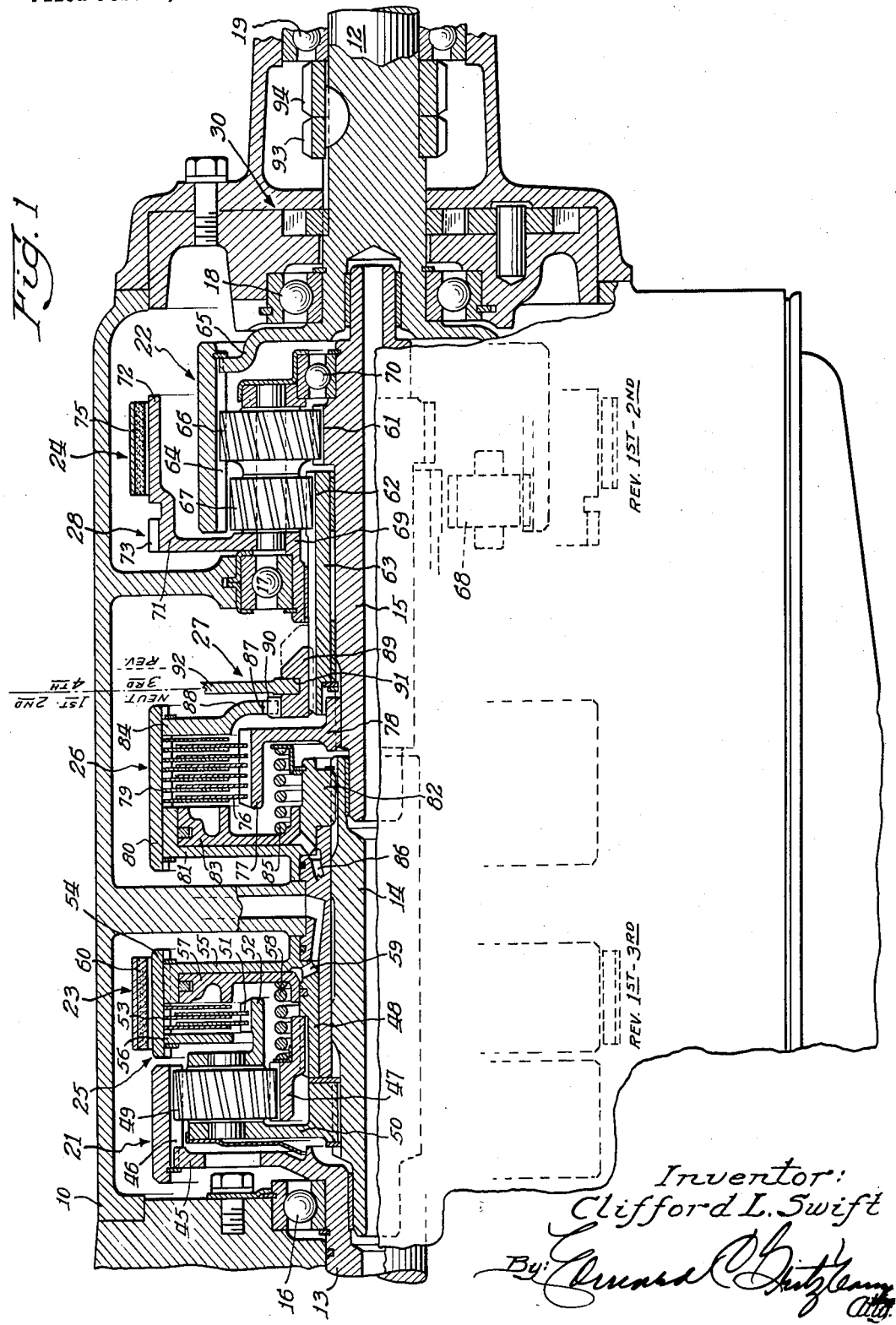

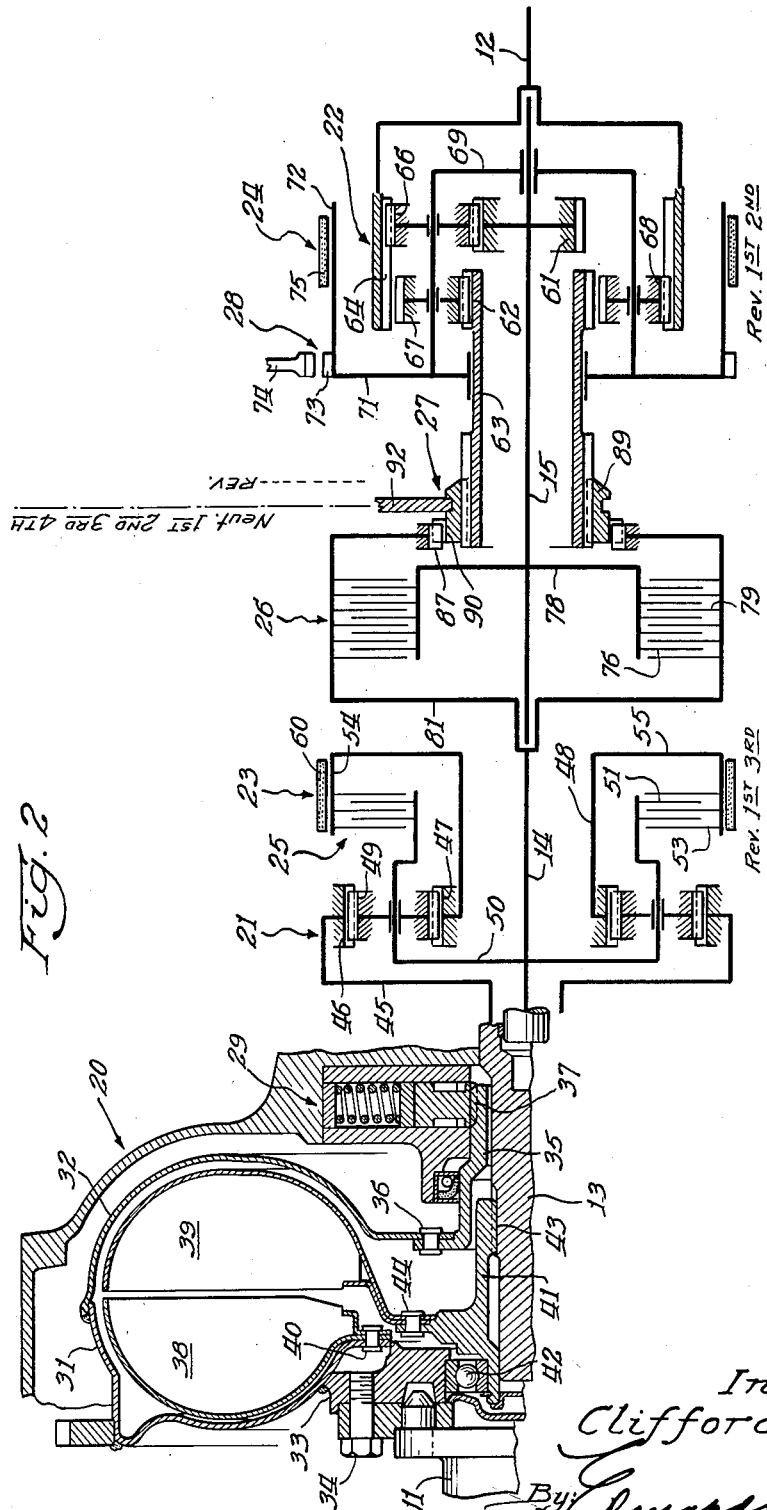

2,722,141

TRANSMISSION

Clifford L. Swift, Muncie, Ind., assignor to Borg-Warner Corporation, Chicago, Ill., a corporation of Illinois Application February 9, 1951, Serial No. 210,198

1 Claim. (Cl. 74—763)

The present invention relates generally to transmissions for automotive vehicles and more particularly to transmissions of the type employing a hydrodynamic coupling device and planetary gearing.

The principal object of the present invention is to provide an improved transmission for automotive vehicles that employs a hydrodynamic coupling device and a pair of sets of planetary gearing and which is capable of providing four different forward drives and a reverse drive through the transmission.

Another object of the invention is to provide a transmission of the aforementioned type wherein a first planetary gear set is capable of providing either a direct drive or a reduced drive from its input element to its output element and a second planetary gear set, being connected in series with the first, is capable of providing either a direct or a reduced forward drive and a reverse drive from its input element to its output element.

Another object is to provide a transmission of the aforementioned type wherein the hydrodynamic coupling device is at all times driven by the engine of the vehicle and wherein the hydrodynamic coupling device, at all times, drives the planetary gearing. By having the hydrodynamic coupling device driven at all times by the engine crankshaft, much smoother operation and softer clutch engagement are obtained.

A more detailed object of the invention is to provide a transmission employing a planetary gear set having two sun gears, each of which may be driven individually or simultaneously with the other to provide two different forward drives, including direct and reduced forward drive, and one reverse drive through the gear set. In connection with this object of the invention the planetary gear carrier serves as the reaction element for the gear set during both the reduced forward and reverse drives therethrough, a friction brake being provided for holding the carrier stationary during the reduced forward drive and a positive brake supplementing the friction brake during the reverse drive in order to take the additional reaction placed upon the gear set during reverse drive. The friction brake provides a sufficient engaging force during the reduced forward drive through the gear set and because of the inherent ability of a friction brake to engage and disengage smoothly without the addition of a synchronizing element there is a smooth transition between the different forward drives through the planetary gear set.

In connection with the last-mentioned object of the invention another object is to provide a positive clutch which is engaged during all forward drives to complete a drive to one of the sun gears of the planetary gear set and which is disengaged during reverse drive, and a friction clutch which is engageable to complete a drive to the other sun gear of the planetary gear set. Since the positive clutch remains engaged during all forward drives and becomes disengaged only when reverse drive is to become established there is no need for including any synchronizing means for this clutch as its members both become stationary whenever a transition is made from forward to reverse drive or vice versa, and when they are both stationary they may be easily engaged or disengaged.

The above and numerous other objects and advantages of the present invention will become apparent from the following detailed description when read in conjunction with the accompanying drawing, wherein:

Fig. 1 is a detailed elevational view of the transmission; and

Fig. 2 is a schematic illustration of the transmission.

With reference to the drawing, wherein like reference numerals in the different views identify identical parts, a housing 10 is provided for enclosing the transmission which includes a drive shaft 11, a driven shaft 12 and three intermediate shafts, 13, 14 and 15. A plurality of bearing elements 16, 17, 18 and 19 rotatably support the shafts 12—15 within the housing 10. The transmission also includes a fluid coupling 20, two planetary gear sets 21 and 22, two friction brakes 23 and 24, two friction clutches 25 and 26, a positive clutch 27 and a positive brake 28. A front fluid pump 29 and a rear fluid pump 30 are also provided, the front pump 29 being driven directly by the engine drive shaft 11 and the rear pump 30 being driven by the driven shaft 12. The two pumps 29 and 30 are both conventional and no further description thereof will be given.

The fluid coupling 20 includes a housing comprising two sections 31 and 32, the section 31 being welded to a flange 33 secured to the engine drive shaft 11 by means of bolts 34. The section 32 is welded, as shown, to the section 31 and is secured to a short sleeve shaft 35 rotatable about the intermediate shaft 13, by means of a plurality of rivets 36. The shaft 35 has a gear 37 formed integrally therewith for operating the pump 29 and as is apparent, the pump 29 functions to pump oil at all times when the drive shaft 11 is rotating. The fluid coupling 20 includes a driving element 38 and a driven element 39. The driving element 38 is secured to the housing section 31 by means of a plurality of rivets 40 and consequently is rotated directly with the engine drive shaft 11. A cylindrical sleeve member 41, rotatably mounted with respect to the flange 33 by means of a bearing element 42, pilots the intermediate shaft 13 and is splined to the intermediate shaft 13 as indicated at 43. The driven element 39 of the fluid coupling 20 is secured to the sleeve member 41 by means of a plurality of rivets 44 and consequently drives the intermediate shaft 13. A more detailed description of the operation of the fluid coupling 20 will not be given as the operation of this type of a device is well-known in the art. The fluid coupling 20 is filled with a fluid, preferably oil, and when the driving element 38 is rotated, the driven element 39 also rotates but may slip with respect to the driving element 38.

The intermediate shaft 13 is formed with a radially extending flange 45 that is splined to a toothed cylindrical member forming the ring gear 46 of the planetary gear set 21. The planetary gear set 21 also includes a sun gear 47 splined to a short rotatable sleeve 48, a plurality of planetary pinions 49, which mesh with both the ring gear 46 and the sun gear 47, and a planetary gear carrier 50 splined to the intermediate shaft 14.

The friction clutch 25 is provided for connecting the carrier 50 with the sun gear 47 of the planetary gear set 21 in order to lock the elements of the gear set 21 against relative rotation. One element of the friction clutch 25 comprises a plurality of friction discs 51 which are splined to an axially extending flange 52 on the carrier 50. The other element of the friction clutch 25 comprises a plurality of friction discs 53 splined to a cylindrical drum 54 which itself is splined to a radially extending flange 55 integrally formed on the sleeve shaft 48. An abutment disc 56 is splined and keyed to the drum 54 and when a piston 57 is moved to the left (as viewed in Fig. 1) the discs 51 and 53 are compressed between the abutment 56 and the piston 57 to cause engagement of the clutch 25. A compression spring 58 abuts the side of the sun gear 47 and continuously urges the piston 57 to the right tending to cause disengagement of the clutch 25. The clutch 25 is fluid pressure engaged and when fluid under pressure is admitted through a conduit 59 into the cylinder, formed by the sleeve 48 and the flange 55, and behind the piston 57, the piston is moved to the left to cause engagement of the clutch 25.

The friction brake 23 is provided for braking the sun gear 47 and is preferably engaged by the application of fluid pressure to an operating motor (not shown). The friction brake 23 comprises a friction resistant band 60 that surrounds the outer periphery of the drum element 54 and upon contraction of the band 60 the drum 54 is engaged and held stationary. It is therefore obvious that upon engagement of the band 60 with the drum 54, the sun gear 47 is held stationary so that upon rotation of the intermediate shaft 13, the intermediate shaft 14 is rotated in the same direction but at a reduced speed.

The planetary gear set 22 comprises a first sun gear 61 integrally formed on the shaft 15, a second sun gear 62 integrally formed on a shaft 63 concentric with and rotatable around the intermediate shaft 15, a ring gear 64 splined to a flange 65 integrally formed on the driven shaft 12, a plurality of planetary pinions 66 which mesh with both the sun gear 61 and the ring gear 64, a plurality of planetary pinions 67 which mesh with the sun gear 62 and a plurality of planetary pinions 68 which mesh with both the ring gear 64 and with the pinions 67. The pinions 66, 67 and 68 are rotatably mounted upon a planetary pinion carrier 69 which itself is rotatably supported with respect to the intermediate shaft 15 by means of a bearing element 70. The planetary gear carrier 69 has a radially extending flange 71 on which is formed on axially extending flange or drum 72. The drum 72 is formed with a plurality of teeth 73 uniformly spaced around its periphery and these teeth comprise the rotatable element of the positive brake 28. The positive brake 28 also includes a pawl 74 which is movable into engagement with the teeth 73 in order to brake rotation of the planetary gear carrier 69. The drum 72 also comprises the rotatable element of the friction brake 24. The stationary element of the friction brake 24 comprises a band 75 which is contractible, preferably by means of a fluid pressure motor (not shown), until it engages the drum 72 and upon engagement of the band 75 with the drum 72 the brake 24 is also effective to brake rotation of the planetary gear carrier 69.

The friction clutch 26 is provided for clutching the sun gear 61 to the intermediate shaft 14 and the positive clutch 27 is provided for clutching the sun gear 62 to the intermediate shaft 14. One element of the friction clutch 26 comprises a plurality of discs 76 splined to a cylindrical element 77 integrally formed on a radially extending flange 78 that is splined to the intermediate shaft 15. The other element of the friction clutch 26 comprises a plurality of discs 79 splined to a cylindrical member 80. The cylindrical member 80 is splined and keyed to a radially extending flange 81 integrally formed on a collar 82 splined to the intermediate shaft 14. The collar 82 and flange 81 together form a cylinder within which a piston 83 is seated. When the piston 83 is moved to the right the discs 76 and 79 are compressed against an abutment member 84 that is splined and keyed to the cylindrical member 80, to thereby cause engagement of the friction clutch 26. A compression spring 85 normally urges the piston 83 to the left (as viewed in Fig. 1) to cause disengagement of the friction clutch 26 but upon the admission of fluid under pressure through a conduit 86 into the cylinder behind the piston 83 the piston is moved to the right to cause engagement of the clutch 26.

The positive clutch 27 comprises a plurality of teeth 87 formed on an extension 88 of the abutment member 84 and also includes a collar 89, keyed to but axially slidable upon the shaft 63, which has a plurality of teeth 90 around its periphery that mesh with the teeth 87. The collar 89 is formed with a peripheral groove 91 for receiving an operating yoke 92. When the yoke 92 occupies the position shown in Fig. 1 the positive clutch 27 is engaged but when the yoke 92 is moved to the position shown by dotted lines in Fig. 1 the clutch 27 is disengaged. Upon disengagement of the clutch 27 the sun gear 62 is disconnected from the shaft 14. It is apparent however, that whenever the clutch 27 is engaged the sun gear 62 is driven.

The driven shaft 12 has a pair of gears 93 and 94 splined thereto, the gear 93 being provided for operating the speedometer of the vehicle and the gear 94 for operating a governor (not shown).

The transmission disclosed herein provides, as stated heretofore, four forward drives between the drive shaft 11 and the driven shaft 12 and reverse drive between these shafts. The following table shows when the clutches and brakes are engaged and disengaged during the establishment of each of the gear trains through the transmission.

|  | Clutches | | | Brakes | | |
| --- | --- | --- | --- | --- | --- | --- |
|  | 25 | 26 | 27 | 23 | 24 | 28 |
| First | Off | Off | On | On | On | Out. |
| Second | On | Off | On | Off | On | Out. |
| Third | Off | On | On | On | Off | Out. |
| Direct | On | On | On | Off | Off | Out. |
| Reverse | Off | On | Off | On | On | In. |

Proceeding with the description of the operation of the present transmission, first or the lowest forward power train may be established through the transmission by engaging the positive clutch 27 and the brakes 23 and 24 while the other clutches and brake are disengaged. The low forward speed train then proceeds from the engine drive shaft 11, through the fluid coupling 20, through the intermediate shaft 13 to the ring gear of the first planetary gear set 21. Since the brake 23 is engaged and the clutch 25 is disengaged at this time, the sun gear 47 is held stationary and the ring gear 46 causes the pinion 49 and the carrier 50 to be rotated at a reduced speed and in the same direction as the intermediate shaft 13. The drive then proceeds from the carrier 50, through the intermediate shaft 14, and through the positive clutch 27 to the sun gear 62. The sun gear 62 is driven in a forward direction at a reduced speed with respect to the drive shaft 11. Inasmuch as the brake 24 is engaged at this time, the carrier 69 is held stationary and rotation of the sun gear 62 causes the pinions 67 and 68 to rotate about their own axes and in turn cause the ring gear 64 and driven shaft 12 to be rotated in a forward direction but at a reduced speed with respect to the speed of rotation of the sun gear 62. During low forward drive, speed reduction and torque multiplication take place in both planetary gear sets 21 and 22.

Second speed or low intermediate forward drive through the transmission may be established by engaging the clutches 25 and 27 and engaging the brake 24 while the other clutch and brakes are disengaged. Engagement of the clutch 25 causes the planetary gear carrier 50 to be locked to the sun gear 47 and consequently the planetary gear set 21 rotates as a unit at this time. Therefore the power train for low, intermediate forward drive through the transmission proceeds from the engine drive shaft 11, through the fluid coupling 20, through the intermediate shaft 13, through the planetary gear set 21, which is rotating as a unit at this time, through the intermediate shaft 14 and through the positive clutch 27 to the first sun gear 62. As is apparent, the sun gear 62 is driven at the same speed of rotation as the drive shaft 11. Since the brake 24 is engaged during second forward speed drive the power train through the second planetary gear set 22 is the same as that traced for low forward drive. Therefore the drive for second forward speed proceeds from the first sun gear 62, through the planetary pinions 67 and 68 and through the ring gear 64 to the driven shaft 12. Speed reduction and torque multiplication take place in only the planetary gear set 22 during second forward speed drive.

Third speed or high intermediate forward drive through the transmission may be established by engaging the clutches 26 and 27 and engaging the brake 23 while the other clutch and brakes are disengaged. Due to the fact that the brake 23 is engaged at this time, the intermediate shaft 14 is driven through the same train as previously traced during low speed forward drive, and this train proceeds from the engine drive shaft 11 through the fluid coupling 20, through the intermediate shaft 13, through the planetary gear set 21 to the intermediate shaft 14. Inasmuch as both the clutches 26 and 27 are engaged during third speed forward drive it is apparent that both sun gears 62 and 61 are locked together. Therefore the second planetary gear set 22 rotates as a unit during high intermediate forward drive and this power train proceeds from the intermediate shaft 14 through both clutches 26 and 27, through both sun gears 62 and 61, and through the planetary gear set 22, which is rotating as a unit at this time, through the ring gear 64 to the driven shaft 12. Speed reduction and torque multiplication take place only in the first planetary gear set 21 during third forward speed drive.

High speed or direct drive may be established through the transmission by engaging the clutches 25, 26 and 27 and disengaging all of the brakes. Engagement of the clutch 25 causes the first planetary gear set 21 to be locked up so that it rotates as a unit, and engagement of the clutches 26 and 27 causes both sun gears 62 and 61 to rotate in unison to thereby cause the second planetary gear set 22 to also be locked up and rotated as a unit. There is, therefore, a direct drive established from the drive shaft 11 to the driven shaft 12 which proceeds from the drive shaft 11, through the fluid coupling 20, through the intermediate shaft 13, through the first planetary gear set 21, through the intermediate shaft 14, through the clutches 26 and 27, through the sun gears 62 and 61, and through the planetary gear set 22 to the driven shaft 12. There is no torque multiplication by the transmission during direct drive.

A reverse drive power train may be established through the transmission by engaging the clutch 26 and engaging all three brakes 23, 24 and 28, while the other clutches are disengaged. At this time the intermediate shaft 14 is driven at a reduced drive with respect to the drive shaft 11, due to the engagement of the brake 23. Disengagement of the clutch 27 prevents the drive from proceeding to the sun gear 62 and engagement of the clutch 26 causes only the sun gear 61 in the second planetary gear set 22 to be driven. Engagement of the brakes 28 and 24 hold the rear planetary gear carrier 69 against rotation to thereby provide a reaction element for the rear planetary gear set 22. The reverse drive power train therefore proceeds from the engine drive shaft 11, through the fluid coupling 20, through the intermediate shaft 13, through the planetary gear set 21, where it is reduced, through the intermediate shaft 14, and through the clutch 26 to the intermediate shaft 15 and sun gear 61. The sun gear 61 is obviously driven in a forward direction but since the planetary gear carrier 69 is held against rotation, rotation of the sun gear 61 causes the planetary pinion 66 to rotate the ring gear 64 and driven shaft 12 reversely. Speed reduction and torque multiplication take place in both planetary gear sets 21 and 22, and torque reversal takes place in the planetary gear set 22 during reverse drive.

The present invention provides an efficient and smooth operating four forward speed planetary gearing type transmission. Although no control circuits have been shown for operating the various clutches and brakes it is contemplated that conventional hydraulic means may be used to control and operate these clutches and brakes.

From the foregoing description it will be apparent to those skilled in the art that numerous changes and modifications may be made in the invention without departing from the spirit or scope thereof.

I claim:

In transmission mechanism, the combination of a drive shaft, a driven shaft, a planetary gear set having an output element connected to said driven shaft and having a first input element which is driven for a high speed forward and a reverse drive between said shafts and having a second input element which is driven for a low speed forward drive and which is driven along with said first input element to provide said high speed forward drive between said shafts, said gear set having a reaction element which is braked for completing said low forward and reverse drives, a central shaft for driving said first input element and a sleeve shaft disposed over said central shaft for driving said second input element, a multiple plate high speed forward and reverse drive friction clutch for connecting said drive and central shafts and comprising an outer cylindrical drum portion connected to said drive shaft and an inner cylindrical drum portion connected to said central shaft and a plurality of interleaved friction plates alternately fixed with respect to said inner and outer drum portions, and a low and high speed forward drive positive clutch for connecting said outer drum portion and said sleeve shaft and comprising a plurality of clutch teeth provided on said outer drum portion and a collar slidable on and non-rotatively fixed on said sleeve shaft and having a plurality of teeth engageable with said first-mentioned clutch teeth.

References Cited in the file of this patent

UNITED STATES PATENTS

| 944,597 | Brush | Dec. 28, 1909 |
| 2,132,728 | Ford | Oct. 11, 1938 |
| 2,220,174 | Ravigneaux | Nov. 5, 1940 |
| 2,287,279 | Stumpf | June 23, 1942 |
| 2,303,975 | Banker | Dec. 1, 1942 |
| 2,349,880 | Orelind | May 30, 1944 |
| 2,354,257 | Greenlee | July 25, 1944 |
| 2,481,212 | Greenlee | Sept. 6, 1949 |
| 2,518,825 | Simpson | Aug. 15, 1950 |
| 2,532,897 | Dodge | Dec. 5, 1950 |
| 2,559,128 | McFarland | July 3, 1951 |
| 2,560,886 | Orr | July 17, 1951 |
| 2,570,327 | Dodge | Oct. 9, 1951 |
| 2,605,652 | Kelbel | Aug. 5, 1952 |

FOREIGN PATENTS

| 632,292 | Great Britain | Dec. 30, 1945 |
| 261,257 | Switzerland | Aug. 16, 1949 |
| 9,489 | Great Britain | May 1, 1908 |
| 614,340 | France | Dec. 11, 1926 |
| 929,571 | France | Dec. 31, 1947 |